(12) United States Patent
Kong et al.

(10) Patent No.: US 10,917,018 B2
(45) Date of Patent: Feb. 9, 2021

(54) AUXILIARY WINDING GROUND FAULT DETECTION FOR ISOLATED DC/DC CONVERTER

(71) Applicant: DIALOG SEMICONDUCTOR INC., Campbell, CA (US)

(72) Inventors: Pengju Kong, Campbell, CA (US); Duc Doan, Campbell, CA (US); Fuqiang Shi, Campbell, CA (US)

(73) Assignee: DIALOG SEMICONDUCTOR INC., Campbell, CA (US)

( * ) Notice: Subject to any disclaimer, the term of this patent is extended or adjusted under 35 U.S.C. 154(b) by 98 days.

(21) Appl. No.: 15/986,712

(22) Filed: May 22, 2018

(65) Prior Publication Data
US 2018/0269792 A1  Sep. 20, 2018

Related U.S. Application Data

(63) Continuation of application No. 15/583,800, filed on May 1, 2017, now Pat. No. 9,979,305, which is a continuation of application No. PCT/US2015/067166, filed on Dec. 21, 2015.

(60) Provisional application No. 62/146,174, filed on Apr. 10, 2015.

(51) Int. Cl.
*H02M 3/335* (2006.01)
*H02M 1/32* (2007.01)
*H02M 1/08* (2006.01)
*H02M 1/00* (2006.01)

(52) U.S. Cl.
CPC ......... *H02M 3/33523* (2013.01); *H02M 1/08* (2013.01); *H02M 1/32* (2013.01); *H02M 2001/0003* (2013.01)

(58) Field of Classification Search
CPC ...... H02M 3/33523; H02M 1/08; H02M 1/32; H02M 2001/0003; H02M 3/33507; H02M 3/33515
USPC ......... 363/21.16, 21.12, 21.13, 21.15, 21.17, 363/21.18
See application file for complete search history.

(56) References Cited

U.S. PATENT DOCUMENTS

| | | | | |
|---|---|---|---|---|
| 1,004,427 A | * | 9/1911 | Hillyer | B65G 59/02 221/236 |
| 8,199,537 B2 | * | 6/2012 | Yan | H02M 3/33523 363/21.12 |
| 8,553,431 B2 | * | 10/2013 | Zheng | H02M 3/33507 363/21.12 |

(Continued)

FOREIGN PATENT DOCUMENTS

| | | |
|---|---|---|
| CN | 101282078 | 10/2008 |
| CN | 103166198 | 6/2013 |

(Continued)

OTHER PUBLICATIONS

Received STIC search report from EIC 2800 searcher Samir Patel dated Sep. 10, 2018 for claims 1, 5 and 7. (Year: 2018).*

(Continued)

*Primary Examiner* — Shawki S Ismail
*Assistant Examiner* — Htet Z Kyaw
(74) *Attorney, Agent, or Firm* — Haynes and Boone, LLP

(57) ABSTRACT

A flyback converter is provided with a controller that is configured to analyze the reflected feedback voltage waveforms to determine the presence of a ground connection fault for the auxiliary winding.

5 Claims, 5 Drawing Sheets

(56) References Cited

U.S. PATENT DOCUMENTS

| | | | | |
|---|---|---|---|---|
| 8,582,329 B2* | 11/2013 | Gao | .......................... | H02M 1/36 363/21.16 |
| 8,610,409 B2* | 12/2013 | Orr | ..................... | H02M 1/4208 323/207 |
| 8,742,693 B2* | 6/2014 | Ikeda | ...................... | G05F 1/44 315/254 |
| 8,901,856 B2 | 12/2014 | Ktamura | | |
| 9,350,252 B2 | 5/2016 | Zhang et al. | | |
| 9,473,033 B2 | 10/2016 | Chin et al. | | |
| 9,520,769 B2* | 12/2016 | Pasqua | ..................... | H02M 1/36 |
| 9,520,797 B2* | 12/2016 | Kong | ................ | H02M 3/33523 |
| 9,559,597 B2* | 1/2017 | Malinin | ............ | H02M 3/33507 |
| 9,647,560 B2* | 5/2017 | Kong | ................ | H02M 3/33507 |
| 9,768,697 B2* | 9/2017 | Fahlenkamp | ..... | H02M 3/33507 |
| 9,871,454 B1* | 1/2018 | Yee | ..................... | H02M 3/33523 |
| 9,985,543 B1* | 5/2018 | Yi | ..................... | H02M 3/33592 |
| 10,008,944 B2* | 6/2018 | Li | ..................... | H02M 3/33507 |
| 10,033,288 B2* | 7/2018 | Yao | ................... | H02M 3/33576 |
| 10,298,137 B2* | 5/2019 | Hsu | ..................... | H02M 3/33523 |
| 2006/0034102 A1* | 2/2006 | Yang | ................ | H02M 3/33507 363/21.13 |
| 2007/0274107 A1* | 11/2007 | Garner | .............. | H02M 3/33523 363/21.12 |
| 2009/0146631 A1* | 6/2009 | Fukumori | ............ | H02M 3/1588 323/284 |
| 2009/0198459 A1* | 8/2009 | Bilac | ..................... | H02H 1/0015 702/58 |
| 2010/0061126 A1* | 3/2010 | Huynh | ............... | H02M 3/33507 363/21.12 |
| 2010/0134085 A1* | 6/2010 | Nishida | ............... | H02M 3/1563 323/285 |
| 2010/0195355 A1* | 8/2010 | Zheng | ............... | H02M 3/33507 363/21.12 |
| 2010/0208500 A1* | 8/2010 | Yan | ................... | H02M 3/33523 363/21.12 |
| 2012/0113689 A1* | 5/2012 | Chen | ................. | H02M 3/33523 363/21.17 |
| 2012/0176819 A1 | 7/2012 | Gao et al. | | |
| 2013/0083572 A1 | 4/2013 | Zhang et al. | | |
| 2013/0121032 A1* | 5/2013 | Shi | ..................... | H02M 3/33507 363/16 |
| 2013/0121049 A1* | 5/2013 | Shi | ..................... | H02M 3/33507 363/89 |
| 2014/0016363 A1* | 1/2014 | Chen | ..................... | H02M 3/335 363/21.02 |
| 2014/0085938 A1 | 3/2014 | Shi et al. | | |
| 2014/0112028 A1* | 4/2014 | Fahlenkamp | .......... | G01R 22/06 363/21.12 |
| 2014/0268919 A1* | 9/2014 | Yao | ................... | H02M 3/33523 363/21.15 |
| 2014/0285106 A1 | 9/2014 | Kitamura | | |
| 2014/0301116 A1* | 10/2014 | Zhang | ............... | H02M 3/33515 363/21.15 |
| 2014/0362612 A1* | 12/2014 | Shi | ..................... | H02M 3/33523 363/21.16 |
| 2015/0160270 A1 | 6/2015 | Shi et al. | | |
| 2015/0162820 A1* | 6/2015 | Zhang | ..................... | H02M 1/32 363/21.16 |
| 2015/0207420 A1* | 7/2015 | Wang | ................ | H02M 3/33507 363/21.12 |
| 2015/0236598 A1* | 8/2015 | Krueger | ............ | H02M 3/33507 363/21.17 |
| 2015/0280574 A1* | 10/2015 | Gong | ................ | H02M 3/33507 363/21.12 |
| 2015/0280578 A1* | 10/2015 | Huang | ............. | H02M 3/33507 363/21.12 |
| 2015/0318777 A1* | 11/2015 | Pasqua | ..................... | H02M 1/36 363/21.13 |
| 2016/0028313 A1* | 1/2016 | Kong | ................ | H02M 3/33507 363/21.12 |
| 2016/0028314 A1* | 1/2016 | Kong | ................ | H02M 3/33507 363/21.12 |
| 2016/0209855 A1* | 7/2016 | Deboy | ..................... | H02M 1/32 |
| 2016/0241150 A1* | 8/2016 | Hsu | ..................... | H02M 3/33523 |
| 2017/0012538 A1* | 1/2017 | Barrenscheen | ... | H02M 3/33507 |
| 2017/0040901 A1* | 2/2017 | Tumminaro | ............ | H02M 1/36 |
| 2017/0207710 A1* | 7/2017 | Kong | ................ | H02M 3/33507 |
| 2017/0212632 A1* | 7/2017 | Shi | ..................... | G06F 3/0416 |
| 2018/0083544 A1* | 3/2018 | Yao | ................... | H02M 3/33523 |
| 2018/0102710 A1* | 4/2018 | Ye | ..................... | H02M 1/4258 |

FOREIGN PATENT DOCUMENTS

| | | |
|---|---|---|
| CN | 103078502 | 5/2018 |
| EP | 1 978 625 A2 | 10/2008 |
| TW | 201435403 | 9/2014 |

OTHER PUBLICATIONS

PCT Search Report and Written Opinion dated Mar. 24, 2016 from corresponding International Application No. PCT/US2015/067166.

Written Opinion of the International Preliminary Examining Authority dated Mar. 21, 2017 from corresponding International Application No. PCT/US2015/067166.

Pichowicz, Nick, "Integrated SMPS Control Circuit TDA8380," Electronic Components & Applications, vol. 9, No. 1, Jan. 1, 1989, pp. 35-55.

Anonymous, "ALTAIR05T-800: Off-Line All-Primary-Sensing Switching Regulator," Oct. 1, 2010, pp. 1-28, http://www.mouser.com/pdfdocs/CD002851.

* cited by examiner

AUXILIARY WINDING GROUND FAULT DETECTION FOR ISOLATED DC/DC CONVERTER

CROSS-REFERENCE TO RELATED APPLICATIONS

This application is a continuation of U.S. patent application Ser. No. 15/583,800, filed May 1, 2017, which is a continuation of International Application No. PCT/US2015/067166, filed Dec. 21, 2015, which claims the benefit of U.S. Provisional Patent Application No. 62/146,174, filed Apr. 10, 2015, all of which are hereby incorporated by reference in their entirety.

TECHNICAL FIELD

This application relates to switching power converters, and more particularly to the regulation of the power supply voltage for a switching power supply controller.

BACKGROUND

The explosive growth in mobile electronic devices such as smartphones and tablets creates an increasing need in the art for compact and efficient switching power converters so that users may recharge these devices. A flyback switching power converter is typically provided with a mobile device as its transformer provides safe isolation from AC household current. This isolation introduces a problem in that the power switching occurs at the primary side of the transformer but the load is on the secondary side. The power switching modulation for a flyback converter requires knowledge of the output voltage on the secondary side of the transformer. Such feedback can be obtained through optoisolators bridging from the secondary side to the primary side but this adds to cost and control complexity. Thus, primary-only feedback techniques have been developed that use the reflected voltage on the primary side of the transformer in each switching cycle.

In a switching cycle for a flyback converter, the secondary current (the current in the secondary winding of the transformer) pulses high after the primary-side power switch is cycled off. The secondary current then ramps down to zero as power is delivered to the load. The delay between the power switch off time and the secondary current ramping to zero is denoted as the transformer reset time (Trst). The reflected voltage on the primary winding at the transformer reset time is proportional to the output voltage because there is no diode drop voltage on the secondary side as the secondary current has ceased flowing. The reflected voltage at the transformer reset time is thus directly proportional to the output voltage based upon the turn ratio in the transformer and other factors. Primary-only feedback techniques sample this reflected voltage through an auxiliary winding to efficiently modulate the power switching and thus modulate the output voltage.

Although primary-only feedback techniques reduce complexity and cost, the associated transformer is relatively heavy compared to other board-mounted components such as integrated circuits. In particular, the transformer is commonly interconnected to its circuit board through the use of solder. Modern recycling standards typically require the use of lead-free solder, which is relatively brittle and thus prone to cracking. The resulting failure of the solder interconnect may occur with regard to the coupling to either the primary or second windings. Such failures will render the resulting flyback unusable but the output voltage will never be driven too high as a result. In contrast, if the auxiliary winding's interconnects fail, a reflected voltage will still appear across the auxiliary winding due to trace inductive, resistive, and capacitive (LRC) effects despite the open circuit fault. The power controller will thus react to this reflected voltage and continue to cycle the primary winding's power switch. As a result, the output voltage may be driven to dangerously-high levels due to the interconnect fault for the auxiliary winding, which results in damage to the associated load. But conventional power controllers have no way of determining that the auxiliary winding interconnects have failed.

Accordingly, there is a need in the art for improved fault detection for primary-only-feedback-regulated flyback converters.

SUMMARY

A flyback converter is provided with a controller that is configured to analyze the reflected feedback voltage waveforms to determine the presence of a ground connection fault for the auxiliary winding.

BRIEF DESCRIPTION OF THE DRAWINGS

Embodiments of the present disclosure and their advantages are best understood by referring to the detailed description that follows. It should be appreciated that like reference numerals are used to identify like elements illustrated in one or more of the figures.

DETAILED DESCRIPTION

To address the need in the art for improved fault detection, a flyback converter controller is provided that is configured to analyze the reflected voltage waveform to detect an interconnect failure for the auxiliary winding. Should the controller detect a failure, it may then reset the switching power converter into an idle mode so that the output voltage is not driven out of regulation. In addition, a signal may be generated to alert the user of the fault condition. These advantageous features may be better appreciated with regard to the following example embodiments.

Figure 1A:
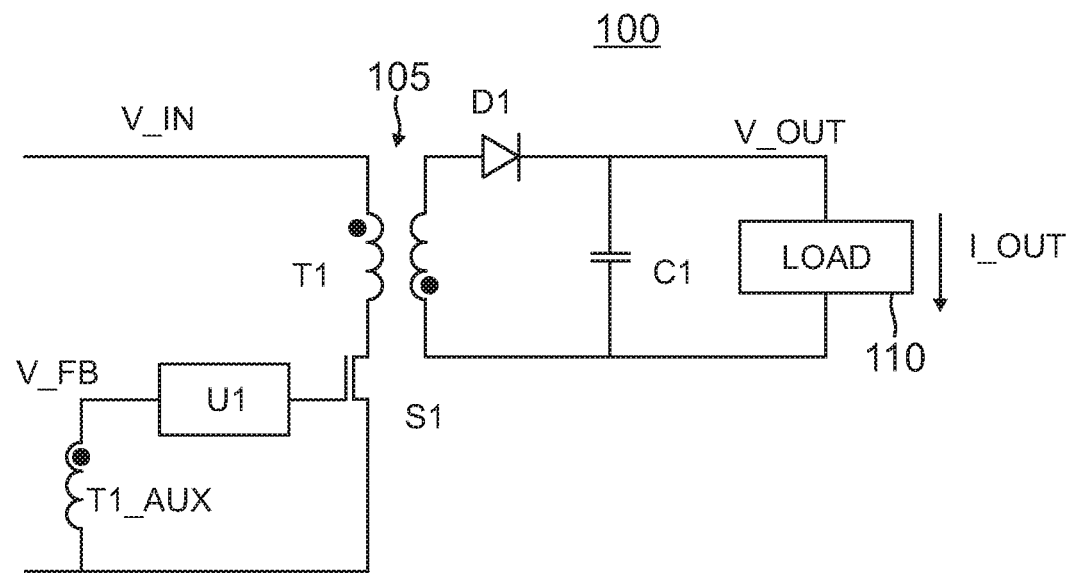
FIG. 1A illustrates a flyback converter including a controller configured to analyze the reflected voltage waveform to detect a fault condition with regard to the auxiliary winding interconnects in accordance with an embodiment of the disclosure.

Turning now to the drawings, FIG. 1A illustrates an example flyback converter 100 including a controller U1 configured to practice the default detection method disclosed herein. A rectified input voltage (V_IN) drives a primary winding T1 of a transformer 105 when controller U1 switches on a power switch. In converter 100, the power switch is a MOSFET S1 power switch but it will be appreciated that bipolar junction transistor (BJT) switches may be used in alternative embodiments. To cycle the power switch on, controller U1 charges a gate of power switch transistor S1 to switch it fully on. Based upon the input voltage V_IN and a magnetizing inductance for the transformer, a primary winding current in primary winding T1 then ramps up from zero to a peak current value, whereupon controller U1 switches off power switch transistor S1 to complete a switching cycle.

Controller U1 controls the peak primary current responsive to a feedback (V_FB) voltage derived from a reflected voltage on an auxiliary winding (T1_AUX). When controller U1 switches off power switch transistor S1, a rectifying diode D1 coupled to a second winding S1 of transformer 105 becomes forward biased such that the stored magnetic energy in transformer 105 is delivered as an output voltage (V_OUT) across a load 110 as filtered by a load capacitor C1. It will be appreciated that rectifying diode D1 may be replaced by a synchronous rectification (SR) switch in alternative embodiments. This delivery of energy to load 110 produces a reflected voltage on the auxiliary winding that is a function of the voltage drop across the diode D1 and the output voltage V_OUT. As this energy delivery is depleted, a secondary current in the secondary winding S1 will drop to zero such that there is no voltage drop across diode D1, whereupon the reflected voltage across the auxiliary winding is directly proportional to the output voltage V_OUT. This time is denoted as the transformer reset time (Trst) and represents the ideal time to sample the reflected voltage V_FB to obtain an accurate estimate of the output voltage V_OUT.

The feedback voltage V_FB is just one parameter that may be used in the primary-only feedback implemented by controller U1. For example, the primary winding current may be sampled through a sense resistor (not illustrated) to produce an $I_{sense}$ voltage that represents the primary winding current amplitude. Controller U1 may use the rate of change of the primary winding current as determined through the $I_{sense}$ voltage to indirectly measure the input voltage V_IN. This is quite advantageous as controller 105 may then determine the input voltage V_IN without requiring an additional input pin. In this fashion, controller 105 may process V_FB and $I_{sense}$ from a previous pulse to determine the desired peak primary winding current in the subsequent pulse on a pulse-by-pulse basis.

Figure 1B:
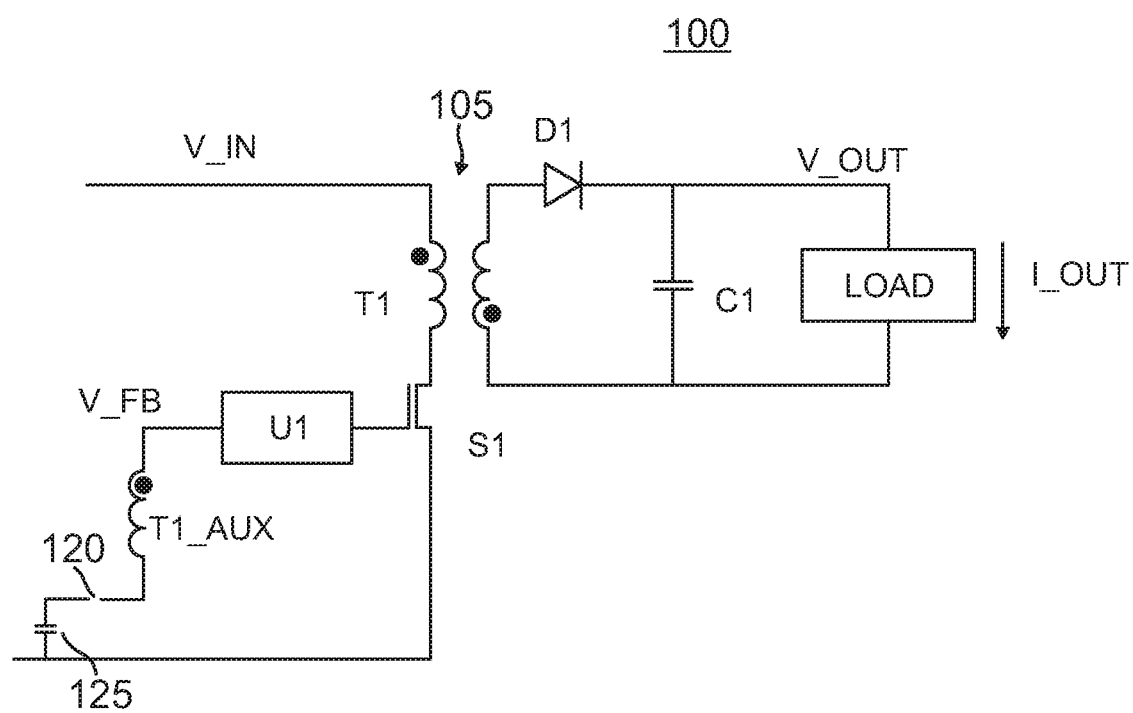
FIG. 1B illustrates the flyback converter of FIG. 1 after occurrence of a ground disconnect for the auxiliary winding.
Figure 2A:
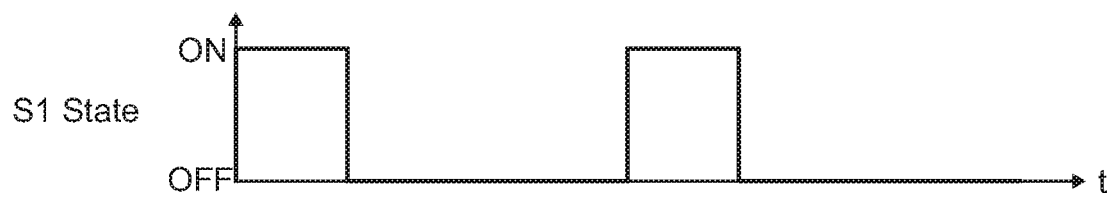
FIG. 2A illustrates two switch cycles for the flyback converter of FIG. 1B.
Figure 2B:
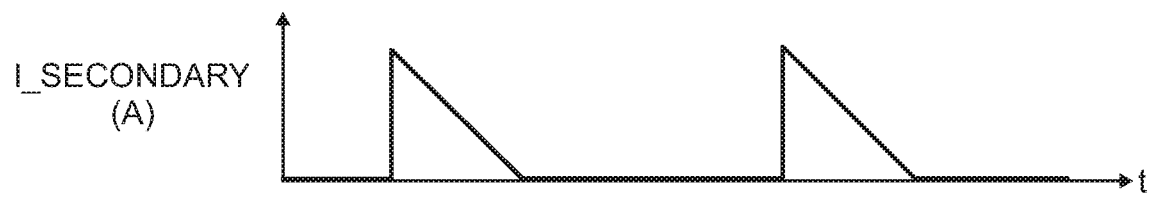
FIG. 2B illustrates the resulting secondary current waveforms in response to the switch cycles of FIG. 2A.
Figure 2C:
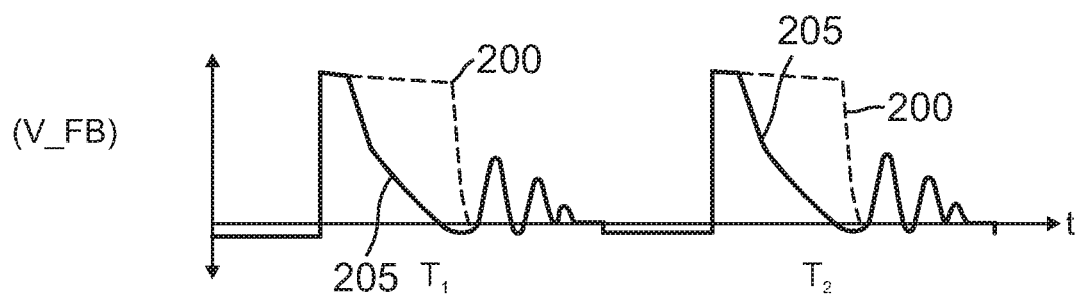
FIG. 2C illustrates the resulting reflected feedback waveforms in response to the switch cycles of FIG. 1B for both the presence and absence of an auxiliary winding ground disconnect.

Such primary-only feedback control of the output voltage V_OUT by controller U1 is conventional. However, this conventional primary-only feedback control becomes problematic should the auxiliary winding no longer couple to ground as shown in FIG. 1B for flyback converter 100. In particular, an interconnect 120 coupling the auxiliary winding T1_AUX to ground has failed such as through a crack or other defect. Despite this failure, the auxiliary winding may still couple to ground through stray inductive, resistive, and capacitive elements as represented by capacitor 125. The switch state for MOSFET S1, the waveform for the secondary winding current, and the auxiliary voltage waveform are shown in FIG. 2A, FIG. 2B, and FIG. 2C, respectively. As shown in FIG. 2A, the power switch such as MOSFET S1 is pulsed on to drive current through the primary winding. When S1 is turned off, the secondary current (I_SECONDARY) is pulsed high to then linearly ramp down to zero as shown in FIG. 2B. During a normal mode of operation (no interconnect failures), the resulting reflected voltage V_FB is as shown by dotted line 200. There are two cycles of MOSFET S1 and thus two corresponding cycles for reflected voltage 200 (as used herein, the term "cycle" is used to refer to the voltage waveform that is produced responsive to one switching cycle for the power switch transistor).

Should the auxiliary winding become disconnected due to interconnect fault 120, faulty reflected voltage cycles 205 are produced. Each pulsing of switch S1 produces a corresponding cycle of the faulty reflected voltage 205. To obtain an estimate of the output voltage in a primary-only feedback architecture, a conventional controller would sample faulty reflected voltage cycles 205 such as at times T1 and T2. Due to the auxiliary winding fault, the sampled feedback voltage (V_FB) for faulty cycles 205 will be considerably lower than the sampled values for normal cycles 200. The difference between the sampled voltage and a threshold voltage is used by primary-only-feedback controllers to calculate the desired peak primary current for the subsequent switching cycle (or cycles). Faulty cycles 205 result in the controller driving excessive peak primary currents due to the abnormally-low values for the samples of the reflected feedback voltage (V_FB). A conventional controller is thus "fooled" by aberrant reflected voltage cycles 205 so as to drive the output voltage out of regulation higher than the desired level. The resulting increased output voltage may damage sensitive load circuits that cannot accommodate such relatively-high voltage levels.

Figure 3:
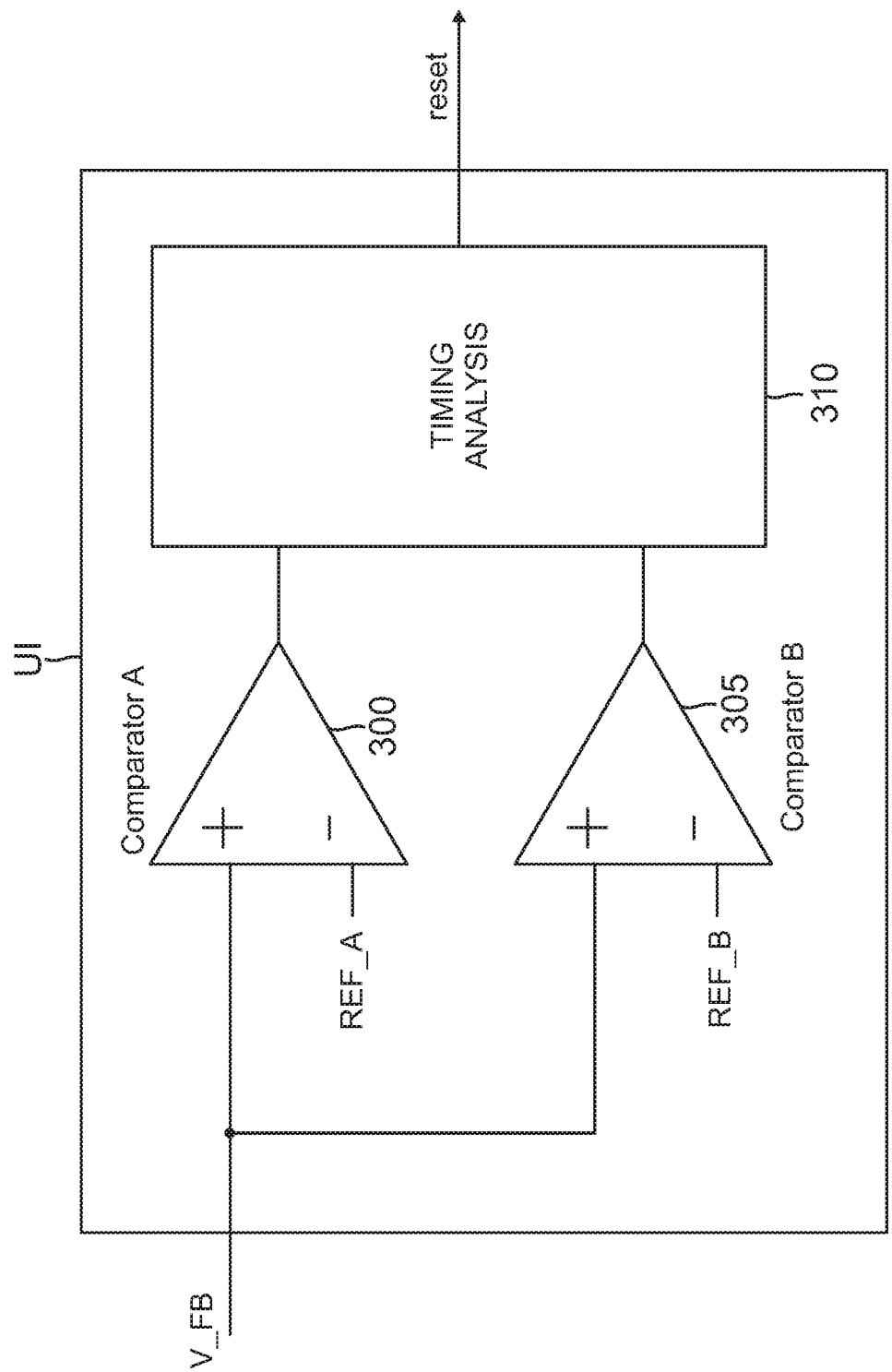
FIG. 3 illustrates an example controller in accordance with an embodiment of the disclosure.
Figure 4A:
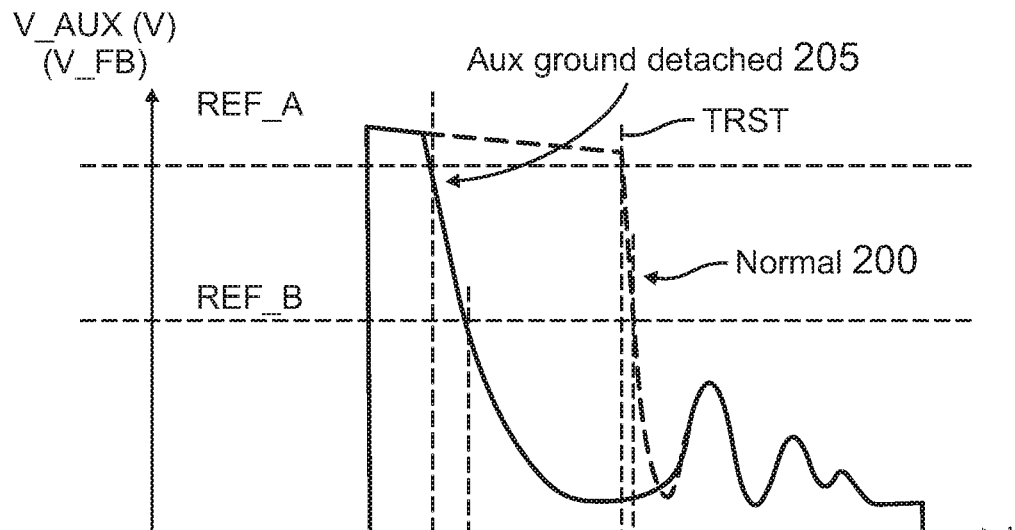
FIG. 4A illustrates the voltage thresholds as compared to the reflected feedback voltage waveform for the controller of FIG. 3.

To prevent the output voltage from being driven out of regulation due to a ground disconnection of the auxiliary winding, controller U1 is configured to detect abnormally-slow declines in the reflected voltage waveforms following the switch off time. For example, controller U1 may include a pair of comparators 300 and 305 as shown in FIG. 3. Comparator 300 compares the feedback voltage to a relatively high threshold voltage (REF_A). In contrast comparator 305 compares the feedback voltage to a lower threshold voltage (REF_B). Both the threshold voltages are chosen such that they are lower than the expected feedback voltage at the transformer reset time as shown in FIG. 4A. Normal reflected feedback voltage cycle 200 will thus only fall below the threshold voltage after the transformer reset time (Trst). In normal reflected voltage cycle 200, the voltage decrease is very rapid after the transformer reset time. In contrast, although faulty reflected feedback voltage cycle 205 begins to decline much earlier, it declines at a slower rate as shown in FIG. 4A. Comparators 300 and 305 are configured to assert their output signals when the feedback voltage is greater than their respective thresholds but it will be appreciated that a complementary configuration in which comparators 300 and 305 assert their output signals only when the feedback voltage is lower than their threshold voltages may be used in alternative embodiments.

Figure 4B:
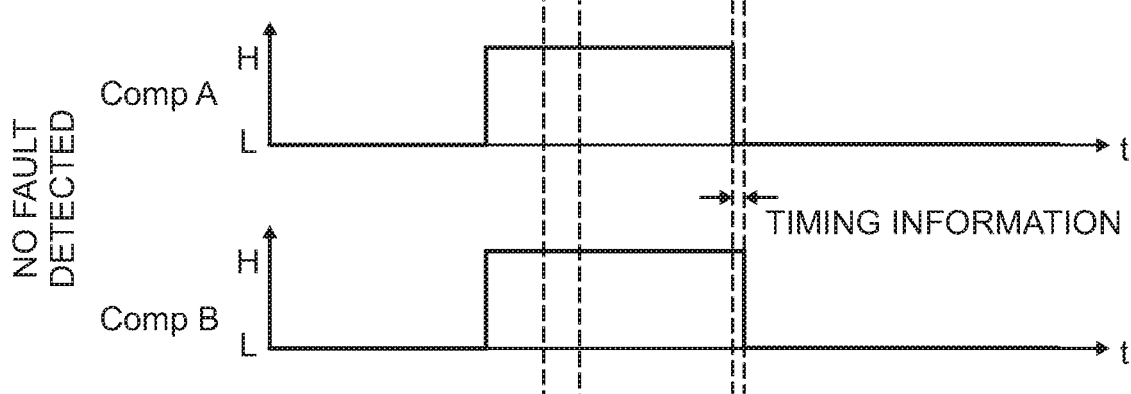
FIG. 4B illustrates the comparator output signals for a normal reflected feedback voltage waveform.

The resulting comparator output signals are shown in FIG. 4B for normal reflected feedback voltage cycle 200.

Figure 4C:
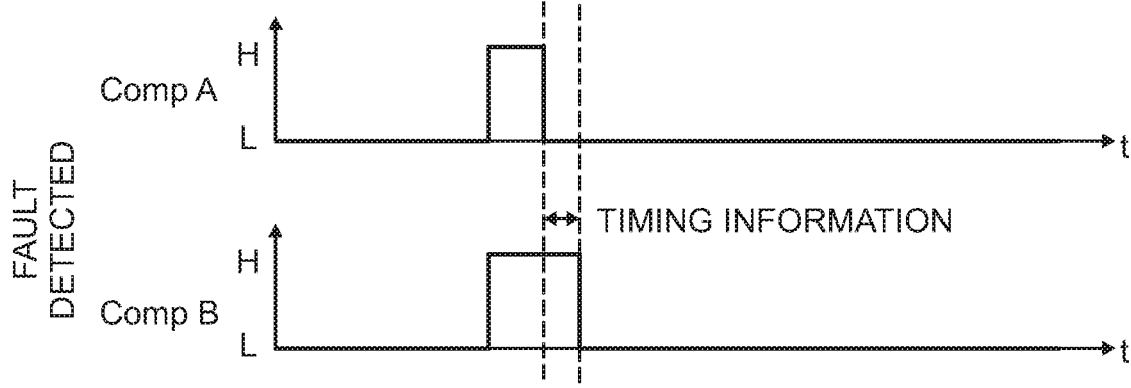
FIG. 4C illustrates the comparator output signals for a faulty reflected feedback voltage waveform due to the presence of an auxiliary winding ground disconnect.

Due to the rapid decline in the feedback voltage subsequent to the transformer reset time, the difference between the time when comparator 300 pulls its output signal low as compared to when comparator 305 pulls its output signal low is relatively small—e.g., 100 nanoseconds. In contrast, the comparator output signals for faulty reflected feedback voltage cycle 205 are shown in FIG. 4C. Due to the relatively slow decline in the feedback voltage when the auxiliary winding is disconnected from ground, the difference in time between the falling edges for the comparator output signals is relatively large—e.g., a microsecond or more. Controller U1 may thus include a timing analysis circuit 310 as shown in FIG. 3 that compares the period between the falling edges for the comparator output signals from comparators 300 and 305 to a threshold level (e.g., 500 nanoseconds). Should the period between the falling edges be less than the threshold value, controller U1 continues in a normal mode of operation. Conversely, should the period exceed the threshold value, controller U1 may trigger a reset to prevent the load from being driven out of regulation. In addition, controller U1 may alert the user regarding the fault condition being detected.

Figure 5A:
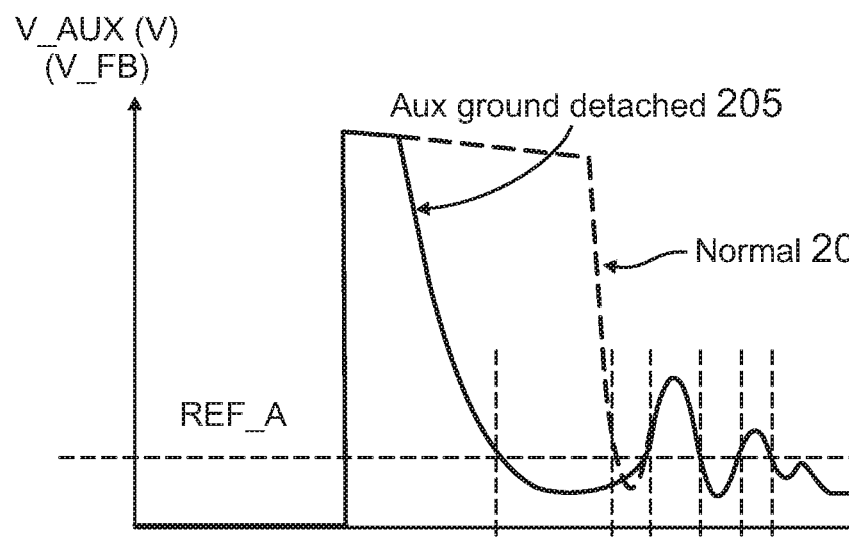
FIG. 5A illustrates a voltage threshold as compared to the reflected feedback voltage waveform for a single-comparator controller embodiment.
Figure 5B:
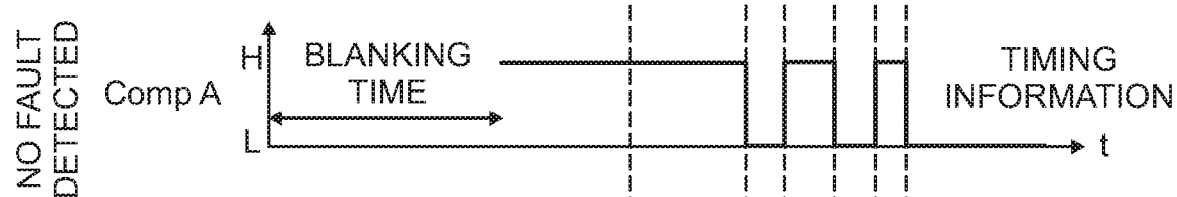
FIG. 5B illustrates the comparator output signal for a normal reflected feedback voltage waveform in a single-comparator controller embodiment.
Figure 5C:
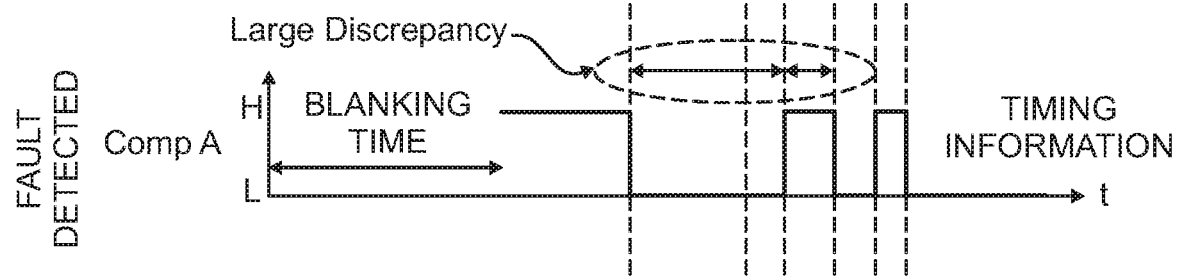
FIG. 5C illustrates the comparator output signal for a faulty reflected feedback voltage waveform in a single-comparator controller embodiment.

An alternative embodiment, controller U1 may determine a fault using just one comparator such as comparator 300. Its reference voltage (REF_A) would be adjusted as shown in FIG. 5A such that it will be crossed by the ringing of the feedback voltage 200 that occurs after the steep decline following the transformer reset time. The ringing is fairly regular or sinusoidal such that the rising edges in the comparator output signal will have a fairly-constant separation as shown in FIG. 5B following normal cycle 200. The falling edges also have this regular separation. But faulty reflected feedback cycle 205 will first have an abnormally-long delay between the initial falling edge in the comparator output signal as compared to the subsequent falling edges. Timing analysis circuit 310 in a one-comparator-embodiment may thus be configured to compare the initial blanking time for the comparator output signal to a threshold value. Should this threshold value be exceed, controller U1 asserts the reset signal and/or signals the user that a fault condition exists. This is quite advantageous as the resulting modification to controller U1 is quite compact as it involves just one or two comparators and some associated timing logic yet the dangers of too-high output voltage due to auxiliary winding disconnects are eliminated.

As those of some skill in this art will by now appreciate and depending on the particular application at hand, many modifications, substitutions and variations can be made in and to the materials, apparatus, configurations and methods of use of the devices of the present disclosure without departing from the scope thereof. For example, alternative detectors as compared to the use of a comparator may be used with regard to determining if the power switch should be cycled to bolster the controller power supply voltage. In light of this, the scope of the present disclosure should not be limited to that of the particular embodiments illustrated and described herein, as they are merely by way of some examples thereof, but rather, should be fully commensurate with that of the claims appended hereafter and their functional equivalents.

We claim:

1. A method, comprising:
   cycling a power switch coupled to a primary winding to generate an output voltage at a load coupled to a secondary winding and to generate a reflected feedback voltage on an auxiliary winding;
   after an off time for the power switch in each cycle of the power switch, timing a delay for the reflected feedback voltage to drop from a first reference voltage to a second reference voltage, wherein the delay exceeds a threshold value responsive to a ground fault for the auxiliary winding; and
   ceasing the cycling of the power switch responsive to the delay exceeding the threshold value.

2. The method of claim 1, further comprising: using at least one comparator to determine when the reflected voltage drops from the first reference voltage to the second reference voltage.

3. The method of claim 1, wherein the timing of the delay comprises:
   detecting a first time when the reflected feedback voltage declines below the first reference voltage; and
   detecting a second time when the reflected feedback voltage declines below the second reference voltage, wherein the second reference voltage is lower than the first reference voltage.

4. A controller for a flyback converter, comprising:
   a comparator configured to compare a feedback voltage on an auxiliary winding for the flyback converter to a reference voltage; and
   a timing analysis circuit configured to measure a delay between a first time when the comparator detects that the feedback voltage is less than the reference voltage and a subsequent second time when the comparator detects that the feedback voltage is less than the reference voltage, wherein the timing analysis circuit is further configured to detect a ground fault for the auxiliary winding responsive to the delay being greater than a threshold delay.

5. The controller of claim 4, wherein the controller is further configured to stop cycling a power switch responsive to the delay being greater than the threshold delay.

* * * * *